April 30, 1957  C. A. CROSS  2,790,340
WORK-LOAD INDICATOR
Filed Sept. 7, 1954  2 Sheets-Sheet 1

INVENTOR.
CHESTER A. CROSS
BY
Robert D. Mentag

April 30, 1957   C. A. CROSS   2,790,340
WORK-LOAD INDICATOR
Filed Sept. 7, 1954   2 Sheets-Sheet 2

INVENTOR.
CHESTER A. CROSS
BY
Robert D. Mentag

United States Patent Office 2,790,340
Patented Apr. 30, 1957

2,790,340

WORK-LOAD INDICATOR

Chester A. Cross, Hazel Park, Mich., assignor to Machine Tool Control Corporation, Detroit, Mich., a corporation of Michigan Application September 7, 1954, Serial No. 454,258

10 Claims. (Cl. 77—32.7)

The present invention relates to a work-load indicator especially adapted for use on a machine tool to indicate the need for a tool change due to dullness of the tool, and which may also be used for other purposes.

It is the primary object of the present invention to provide a work-load indicator which is particularly adapted for use on a fluid operated machine tool, whereby, the cutting tool actuated by the machine will be rendered inoperative when it reaches a predetermined state of dullness.

It is a further object of the present invention to provide a work-load indicator, for use on a fluid motor operated machine tool, which includes a control valve connected to the fluid motor so as to have the working pressure of the fluid motor circuit operate on one end of the control valve spool. The other end of the control valve is acted on by the back pressure in the fluid motor and, by a calibrated spring which can be set to create a certain predetermined pressure on the control valve spool. In a balanced condition in the control valve, the working pressure for a sharp tool is less than the fluid motor back pressure plus the spring pressure and, accordingly, the control valve, under such conditions, is held stationary. As the tool becomes dull, the work load on the tool increases and, the fluid motor back pressure decreases, whereby, the control valve spool will be moved by the working pressure against the spring pressure so as to uncover an outlet line leading to a metering valve. The fluid motor working pressure will be directed through the outlet line and through the metering valve and against a spring biased piston, whereby, the piston will be actuated and, will in turn actuate a micro-switch that will start the reversing mechanism for the machine tool, light a tool inspection light, and hold the tool in the retracted position, thus preventing the machine from cycling, until a reset button is operated.

It is a further object of the present invention to provide a novel work-load indicator which is capable of being assembled in a self-contained unit comprising all the necessary electrical and hydraulic elements and, which may be easily connected to any hydraulically operated machine tool.

It is another object of the present invention to provide a novel work-load indicator which is economical to manufacture, commercially practical and efficient in its performance.

Other objects, features and advantages of the present invention will become apparent from the following detailed description taken in conjunction with the accompanying drawings, in which.

Figure 1:
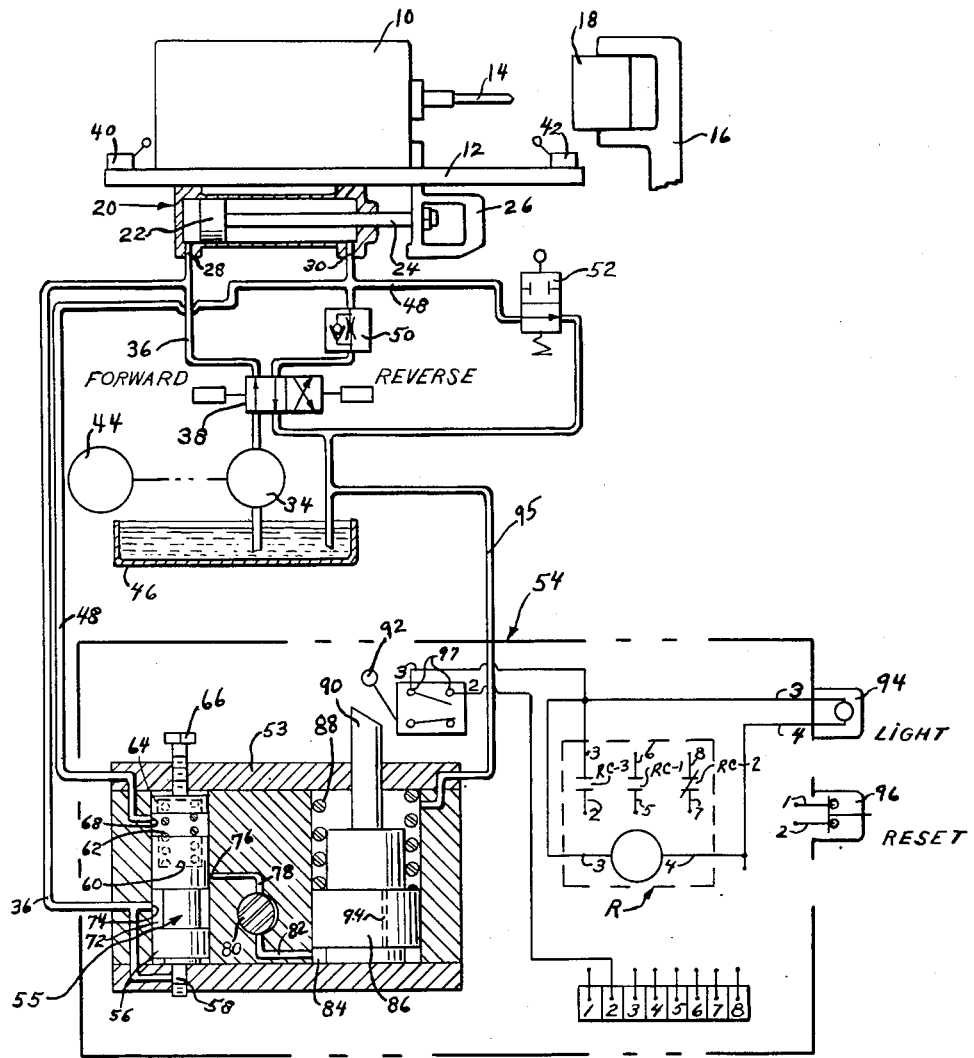
Figure 1 is a diagrammatic illustration representing an embodiment of the invention as applied in connection with a control system for a drill head, showing the drill head advancing toward the workpiece.
Figure 3:
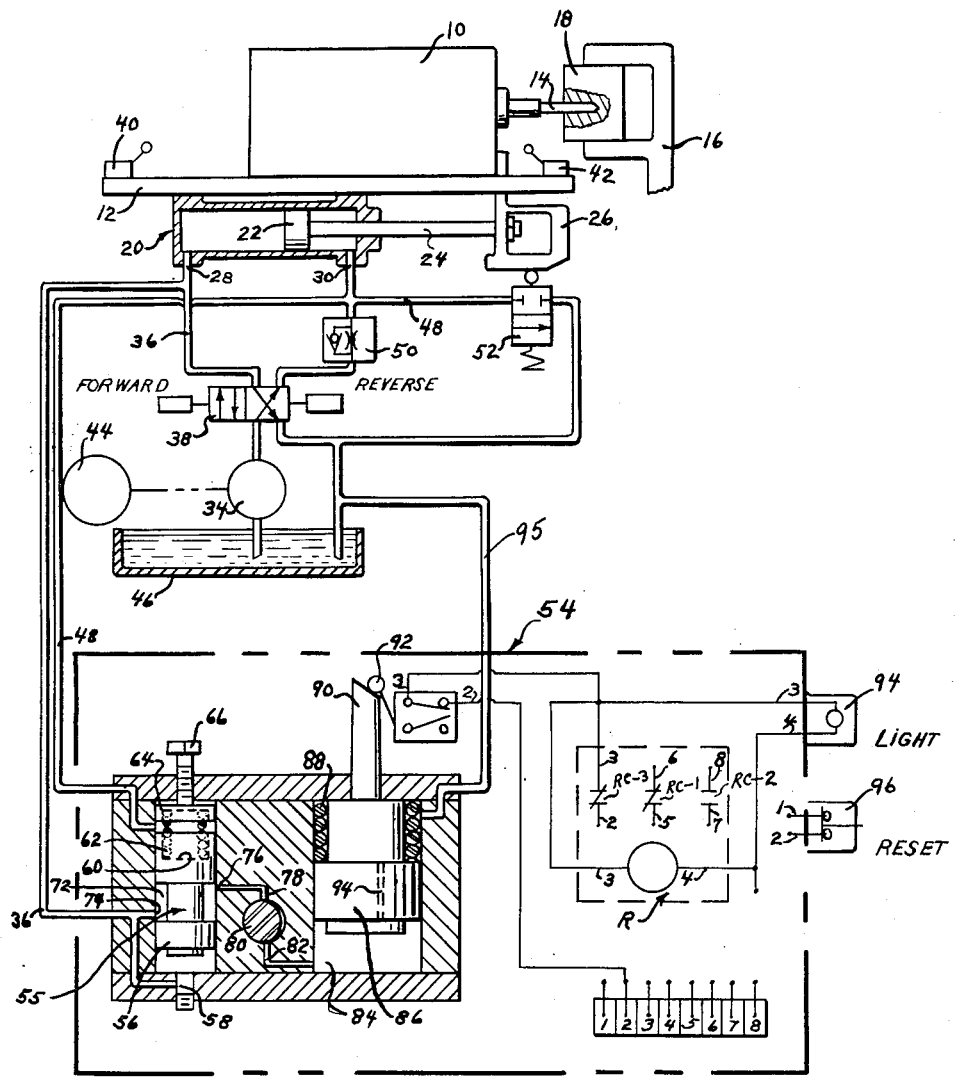
Figure 4:
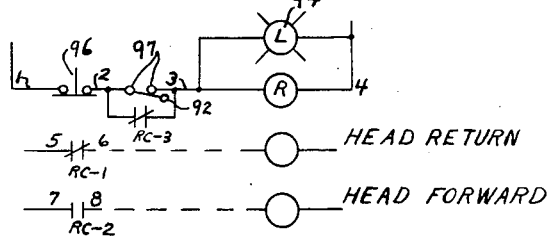

Figure 3 is a diagrammatic illustration of the structure illustrated in Figure 1, showing the work-load indicator in an operative position to return the drill head to a retracted position; and, Figure 4 is a symbolic diagram showing the relationship of the control switches in the electrical control system during a retracting movement of the drill head illustrated in Figures 1 and 3, due to the operation of the work-load indicator.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

Referring now to the drawings, the numeral 10 represents a conventional drill head which is slidably mounted on a suitable bed 12, and which carries a drill 14. The numeral 16 represents a suitable workholder for holding a workpiece, as 18, for operation thereon by the drill 14. The drill head 10 is actuated by means of a conventional fluid motor 20, which includes a piston 22 fixedly connected to a piston rod 24. The drill head 10 is operatively connected to the piston rod 24 by means of a suitable connection member 26.

The fluid motor 20 is provided with an inlet port 28 and an outlet port 30. The inlet port 28 is connected to a fluid pump 34 by means of a suitable conduit as 36, and a conventional directional valve 38 adapted to be operated by the switches 40 and 42 which are mounted on the drill head bed 12, as illustrated in Figure 1. The directional valve 38 may be interconnected and controlled either electrically or hydraulically, in the usual manner, by the switches 40 and 42. The pump 34 is operable by a suitable electric motor, as 44, and is provided with a reservoir or sump 46, as a source of fluid. The outlet port 30 is connected to the sump 46 by means of two parallel return circuits, with one of said circuits leading through a conventional feed control valve 50 and thence through the directional valve 38 and, the other of circuits leading through a conventional by-pass valve 52 and directly to the sump 46 for rapid traverse action.

The numeral 54 represents a self-contained work-load indicator made in accordance with the principles of the invention and having a housing 53 in which is suitably mounted a control valve 55 provided with a spool 56, one end of which is acted on by the working pressure in the fluid circuit, by means of the conduit 36 being connected to the control valve 55 through the inlet port 58. The other end of the spool 56 is provided with a recess, as 60, in which is seated a spring 62 having the other end thereof seated in a movable control member 64 which is capable of being adjusted by a suitable means, as by the screw 66. The control valve 55 is also provided with an inlet port 68 through which the back pressure in the fluid motor 20 is permitted to enter by means of the conduit 48. The control valve spool 56 is provided with a narrowed portion adapted to form a chamber 72, in which fluid at the fluid motor working pressure is admitted by means of the inlet port 74.

The control valve 55 is provided with an outlet port 76, which is connected by means of the conduit 78 to a timing or metering valve 80. A conduit 82 connects the valve 80 to the lower end of a cylinder 84, to a position beneath a spring biased piston 86 mounted in the cylinder 84. The piston 86 is adapted to be moved upwardly by fluid under working pressure admitted through the conduit 82 and, to be moved downwardly to the at-rest position by the spring 88. The piston 86 is provided with an elongated arm 90 adapted to operate a control switch as 92 on the upward stroke. For purposes of resetting the piston 86, a small orifice 94 is provided in the piston 86 to permit the fluid in the lower part of cylinder 84 to pass to the top of the cylinder and thence through conduit 95 back to the reservoir 46.

The principle of operation of the work-load indicator will best be understood by considering the fact that in a fluid motor operated machine tool, the working pressure in the fluid motor is equal to the sum of the back pressure in the fluid motor plus the working load on the tool. In a machine tool where the fluid motor working pressure is constant, as the working load on the tool increases, the fluid motor back pressure decreases. Consequently, in such a machine, as the tool becomes dull, the work load increases and the fluid back pressure decreases. The amount of dullness required to make the fluid back pressure decrease a certain predetermined amount would depend on the type tool involved and it could be determined experimentally for each type tool and machine. The control valve 55 is adapted to sense this change in back pressure and to act in accordance therewith.

The spool 56 is adapted to be engaged on one side thereof by fluid under working pressure from the fluid motor 20 and, on the other side thereof by fluid under back pressure from the fluid motor 20 and also by the pressure from an adjustably mounted spring 62. The spring 62 can be adjusted to produce a force adapted to coact with the back pressure on one end of the spool 56 in a direction opposite to the working pressure on the other end of the spool. The spring force may be adjusted to such a value, whereby, when the drill 14 reaches a predetermined state of undesirable dullness, the spring force plus the decreased fluid back pressure will be less than the fluid working pressure and, accordingly, the spool 56 will be moved to uncover the outlet port 76. Fluid under working pressure is then admitted to the cylinder 84 by way of the timing valve 80 and, accordingly, piston 86 will be moved upwardly and will actuate the control switch 92, to stop the machine or light an indicator light as desired.

In operation, the work-load indicator is interconnected with the regular electrical control system of the machine tool to be controlled, and may be assembled on the machine in a package unit which is provided with the appropriate conductors, switches and contacts.

Figure 2:
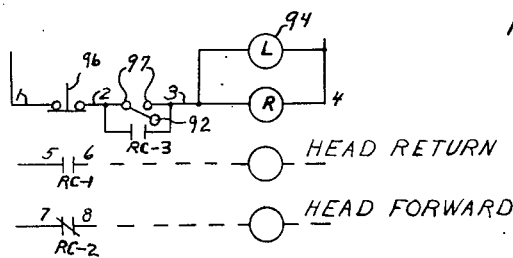
Figure 2 is a symbolic diagram showing the relationship of the control switches in the electrical control system during the forward movement of the drill head as illustrated in Figure 1.

As is best seen in Figures 1 and 2, the electrical control system for the machine tool to be controlled would be provided with normally open relay contacts RC-1, adapted to connect conductors 5 and 6 to complete the usual circuit for controlling the return movement of the movable machine part, such as the drill head 10. The usual circuit for controlling the forward movement of the drill head 10 would include the conductors 7 and 8 connected by the normally closed contacts RC-2. The contacts RC-1 and RC-2 would be automatically operable by means of the relay R, so as to reverse the movement of the drill head 10 when the working load on the drill 14 reached a predetermined value. For example, assuming that the drill 14, shown in Figure 1, had become dull to such an extent that the working load on the drill 14 increased, and the fluid back pressure in the fluid motor 20 decreased, whereby the fluid back pressure plus the calibrated spring pressure on one side of the spool 56 was less than the fluid working pressure on the other side of the spool 56. In such case, the fluid under working pressure would move the spool 56 upwardly to a position as shown in Figure 3, and the fluid would then pass through the conduit 78 to the timing or metering valve 80 and thence to the cylinder 84. The piston 86 would then be moved upwardly by the fluid under working pressure, whereby, the arm 90 would contact the control switch 92. The switch 92 would function to close the contacts 97 and complete a control circuit to operate the relay R and light a signal light as 94. The relay R would function to close the contacts RC-1 in the drill head return circuit and open the contacts RC-2 in the drill head forward circuit. The drill head 10 would thus be returned to the inoperative position and would not function until restarted by the operator. A holding contact RC-3 may be provided in the relay R circuit to maintain the drill head 10 forward circuit inoperative and, a reset switch 96 may be provided in the relay R circuit to enable the operator to manually break the control circuit and reset it for further operation. It will be understood, that the illustrative control could be adapted to merely light an indicator light without making the machine inoperative, if desired.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A work-load indicator for use on a machine tool having a fluid motor for feeding a tool thereon comprising, a control valve having a spool slidably mounted therein, means connecting the working pressure end of the fluid motor to said control valve at one end of said spool so as to admit fluid at working pressure against said one end of the spool, means connecting the back pressure end of the fluid motor to said control valve at the other end of said spool so as to admit fluid at back pressure against said other end of the spool, a resilient biasing means in said control valve disposed to coact with the fluid at back pressure and to balance said spool against the fluid at working pressure and retain the spool in a first position, an outlet port in said control valve, a fluid operated control means capable of stopping the machine, means connecting said outlet port with said control means, whereby, when the tool reaches a predetermined dullness, the back pressure in the fluid motor will decrease and fluid working pressure in the control valve will be larger than the combined pressure of said biasing means and said fluid back pressure and, the spool will be moved to uncover said outlet port to admit the fluid at working pressure to said control means for rendering the tool inoperative.

2. The invention as set forth in claim 1 wherein, said means connecting said outlet port with said control means includes an adjustable timing valve for timing the flow of fluid at working pressure to the control means.

3. The invention as set forth in claim 1 wherein, an adjusting means is provided for adjusting said resilient biasing means to regulate the pressure it exerts on said spool.

4. A device for indicating the dullness and the need for changing of a tool driven by a fluid motor comprising, a fluid-operated disabling means capable of rendering the tool inoperative, a first fluid conduit means interconnecting the working pressure side of the fluid motor and said disabling means so as to permit fluid at working pressure from the fluid motor to operate said disabling means, a control valve operatively connected in said first fluid conduit means to control the flow of fluid to said disabling means, and a second fluid conduit means connecting said control valve to the back pressure side of said fluid motor, whereby, when the tool reaches a predetermined extent of dullness, the fluid back pressure from the motor in said second conduit means will be decreased and said control valve will be operated to permit fluid at working pressure to pass through said first fluid conduit means to said disabling means for operation thereof.

5. The invention as set forth in claim 4 wherein, a metering valve is connected in said first fluid conduit means between said control valve and said disabling means.

6. The invention as set forth in claim 4 wherein, said control valve includes a chamber, a spool slidably mounted in said chamber, a resilient biasing means operable to coact with the fluid at back pressure in said second conduit means to bias said spool to a normal position whereby the flow of fluid at working pressure is prevented until the fluid back pressure is decreased by means of the tool becoming dull.

7. The invention as set forth in claim 6 wherein, a means is provided for adjusting said resilient biasing means to permit said control valve to operate at various back pressures.

8. A control device operable by a predetermined change in load on a fluid motor comprising, a chamber, a spool slidably mounted in said chamber, a first conduit means connecting one end of said chamber to the working pressure side of said fluid motor to permit fluid at working pressure from said motor to engage one end of said spool, a second conduit means connecting the other end of said chamber to the back pressure side of said fluid motor to permit fluid at back pressure from said motor to engage the other end of said spool, a spring means in said chamber operable to engage said other end of said spool and coact with the back pressure to counteract the working pressure on the other end of the spool to hold the spool in a normal position, means for adjusting said spring means to control the spring pressure on said spool, an outlet port in said chamber normally closed by said spool, a fluid operated control means, a third conduit means connecting said outlet port and said control means, whereby, when the load on said motor increases a predetermined amount, the fluid back pressure will decrease and permit the fluid under working pressure to move the spool and uncover said outlet port to permit fluid at working pressure to operate said control means.

9. The invention as set forth in claim 8 wherein, a metering valve is connected in said third conduit means between said control means and said outlet port.

10. A work-load indicator for use on a machine tool having a fluid motor for feeding a tool thereon comprising, a control valve having a spool slidably mounted therein, means connecting the working pressure end of the fluid motor to said control valve at one end of said spool so as to admit fluid at working pressure against said one end of the spool, means connecting the back pressure end of the fluid motor to said control valve at the other end of said spool so as to admit fluid at back pressure against said other end of the spool, a resilient biasing means in said control valve disposed to coact with the fluid at back pressure and to balance said spool against the fluid at working pressure and retain the spool in a first position, an outlet port in said control valve, a fluid operated control means, conduit means connecting said outlet port with said control means, a switch means operated by said control means, said switch means being operatively connected in the control system of the machine, whereby, when the tool reaches a predetermined dullness, the back pressure in the fluid motor will decrease and fluid working pressure in the control valve will be larger than the combined pressure of said biasing means and said fluid back pressure and, the spool will be moved to a second position to uncover said outlet port to admit fluid at working pressure to said control means for operating said switch means for rendering the tool inoperative.

References Cited in the file of this patent

UNITED STATES PATENTS

| | | |
|---|---|---|
| 1,911,132 | Macomber | May 23, 1933 |
| 1,911,138 | Clute et al. | May 23, 1933 |
| 2,335,809 | Stacy | Nov. 30, 1943 |